(No Model.)

E. MARSHALL.
FLY CATCHER.

No. 559,184.  Patented Apr. 28, 1896.

Witnesses
J. A. Dull
O. S. Hay

Inventor
Eli Marshall
per Victor Lazarus
Attorney

UNITED STATES PATENT OFFICE.

ELI MARSHALL, OF HENFIELD, ENGLAND.

FLY-CATCHER.

SPECIFICATION forming part of Letters Patent No. 559,184, dated April 28, 1896.

Application filed April 16, 1895. Serial No. 545,961. (No model.) Patented in England June 19, 1893, No. 12,000.

*To all whom it may concern:*

Be it known that I, ELI MARSHALL, chemist, a subject of the Queen of Great Britain and Ireland, residing at High Street, Henfield, in the county of Sussex, England, have invented an Improved Device for Catching Flies and other Winged Insects, of which the following is a specification.

A patent has been granted to me in England, No. 12,000, dated June 19, 1893.

The means which I employ in accordance with my invention consist of a hollow reel or barrel to serve as a receptacle for any suitable glutinous or viscous matter. Each end of the reel is provided, preferably at or about in line with the longitudinal axis of the containing device, with a perforation, in order to allow of a funicle of any suitable material, looped at one end, being drawn therethrough and in its passage to become coated with the viscous matter contained within the reel aforesaid.

The device which I employ is illustrated in the accompanying sheet of drawings, in which—

Figure 1:
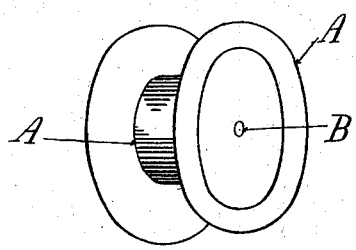
Figure 3:
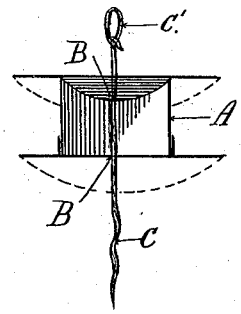
Figure 2:
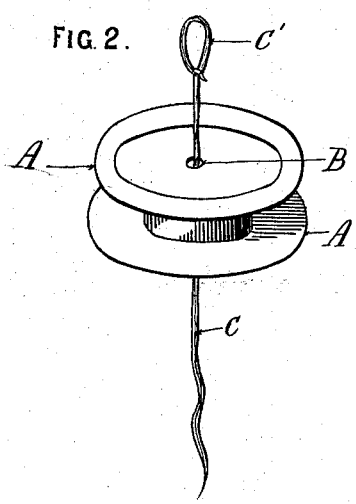
Figure 4:
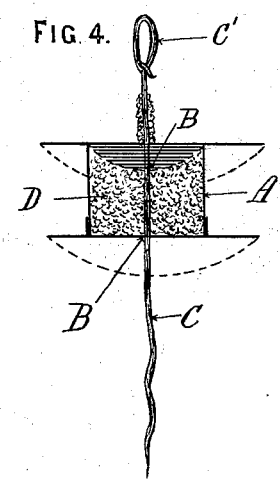

Figures 1 and 2 represent perspective views of said device. Figs. 3 and 4 are vertical sections thereof.

Referring to the views, A indicates the hollow reel or receptacle aforesaid for the viscous matter; B B, the perforations; C, the funicle, looped at C'.

D represents the charge of glutunious or viscous matter.

In applying the device according to my invention the container A, with its charge of glutinous or viscous matter, is suspended in any desired position at the looped end C' of the funicle C. Then on drawing the reel downward the funicle will become coated with the glutinous or viscous matter and so present a very efficacious device of the description generally known as a "fly-catcher."

Having thus described my invention, what I claim, and desire to secure by Letters Patent, is—

1. A fly or insect catching device comprising a cord or fiber, and a receptacle for the sticky material consisting of the reel, the said cord passing through the reel, the latter being adapted to carry the cord or fiber wound thereon, substantially as described.

2. A fly-catcher comprising a receptacle for sticky material and a cord or fiber extending through the same and out at its opposite sides the ends of the fiber or cord being free, substantially as described.

In witness whereof I have hereunto set my hand in presence of two witnesses.

ELI MARSHALL.

Witnesses:
VICTOR LAZARUS,
T. A. TULL.